United States Patent

Kulkarni et al.

[11] 4,020,380
[45] Apr. 26, 1977

[54] REGENERATIVE-CYCLE INCANDESCENT LAMP CONTAINING HgBr₂ ADDITIVE

[75] Inventors: Avinash D. Kulkarni, Montclair; Ralph E. Newton, Dover, both of N.J.

[73] Assignee: Westinghouse Electric Corporation, Pittsburgh, Pa.

[22] Filed: Feb. 4, 1976

[21] Appl. No.: 655,306

Related U.S. Application Data

[63] Continuation-in-part of Ser. No. 565,502, April 7, 1975, abandoned.

[52] U.S. Cl. .............................. 313/222
[51] Int. Cl.² ........................... H01K 1/50
[58] Field of Search ................... 313/222

[56] References Cited

UNITED STATES PATENTS

| | | | |
|---|---|---|---|
| 3,384,774 | 5/1968 | English | 313/222 |
| 3,497,754 | 2/1970 | Johnson | 313/222 |

FOREIGN PATENTS OR APPLICATIONS

| | | |
|---|---|---|
| 131,576 | 9/1968 | Czechoslovakia |
| 125,260 | 12/1967 | Czechoslovakia |
| 1,928,442 | 6/1969 | Germany |
| 1,105,291 | 3/1968 | United Kingdom |
| 952,938 | 3/1964 | United Kingdom ........ 313/222 |
| 952,939 | 3/1964 | United Kingdom ........ 313/222 |

Primary Examiner—Palmer C. Demeo
Attorney, Agent, or Firm—D. S. Buleza

[57] ABSTRACT

The useful life of high-efficiency type bromine-tungsten cycle incandescent lamps, such as those used in TV-studio and theater lighting applications, is enhanced by dosing the lamps with a carefully controlled quantity of mercuric bromide ($HgBr_2$) which dissociates when the filament of the finished lamp is energized and provides a predetermined amount of $Br_2$ within the envelope during lamp operation. The quantity of $HgBr_2$ dosed into the envelope is adjusted according to the design life and initial efficiency parameters of the specific lamp type so as to provide a concentration of $Br_2$ within the envelope which is correlated with such parameters and prevents blackening of the envelope and premature failure of the filament at the particular "life-efficiency level" of operation for which the lamp is designed. For a 1000 watt 120 volt tubular incandescent lamp (DXW type) having a design life of 150 hours and an efficiency of 28 LPW, the $HgBr_2$ dosage is such that it provides from about 2.5 to 6 torr of $Br_2$ within the lamp during operation — whereas a lamp of the same wattage and voltage rating designed to operate for 50 hours at 33 LPW (DXN type) is dosed with a slightly larger quantity of $HgBr_2$ to provide from about 3.5 to 8.5 torr of $Br_2$ within the operating lamp.

10 Claims, 4 Drawing Figures

4,020,380

REGENERATIVE-CYCLE INCANDESCENT LAMP CONTAINING HgBr$_2$ ADDITIVE

CROSS-REFERENCE TO RELATED APPLICATION

This application is a continuation-in-part of application Ser. No. 565,502 filed Apr. 7, 1975 now abandoned.

BACKGROUND OF THE INVENTION

1. Field of the Invention

This invention relates to electric lamps and has particular reference to an improved incandescent lamp of the bromine-cycle type.

2. Description of the Prior Art

Halogen incandescent lamps are per se well known in the art. A lamp of this type in which the regenerative-cycle is established and maintained by a small quantity of dosed elemental iodine (from 0.01 to 1 micromole per cm$^3$ or ml. or bulb volume) is describe in U.S. Pat. No. 2,883,571 issued Apr. 21, 1959 to E. G. Fridrich et al. Another regenerative-cycle lamp that contains a fill gas and bromine or a bromine-releasing compound (such as hydrogen bromide) is disclosed in U.S. Pat. No. 3,091,718 issued May 28, 1963, to J. Shurgan. A halogen-cycle incandescent lamp that contains from 0.01 to 1.0 micromole per ml. of bulb volume of a mercury halogenide (such as mercury bromide or mercury iodide) and is filled with an inert gas such as argon, xenon, nitrogen, or a mixture of such gases, at a pressure of 600 to 650 torr is described in Czechoslovakian Patent No. 131,576 of Jiri Pavlata (published Sept. 15, 1968).

An incandescent projection type lamp in which a halogen-cycle is obtained by filling the lamp with predetermined amounts of mercury, bromine and an inert fill gas (such as nitrogen at a fill pressure of from 64 to 128 torr) is described in German Patent No. 1,928,442 of Bernhard Kopelman filed June 4, 1969 and opened to inspection on Dec. 11, 1969. Other types of incandescent lamps and a combination discharge-and-incandescent type lamp, etc. that contain various kinds and amounts of metal halides such as mercury iodide or mercury bromide are described in British Patent No. 1,105,291 and U.S. Pat. No. 3,497,754.

The dynamic "bulb-cleansing" phenomenon which occurs in halogen-cycle incandescent lamps and the resulting high luminous efficiency makes lamps of this type particularly useful for lighting TV studios and theaters where light of high-brightness and the proper color temperature is required. Bromine-cycle incandescent lamps designed and manufactured for use in such lightning applications in accordance with the prior art sometimes exhibit premature blackening of the envelope or fail to burn at their design efficiency, or for their design life (generally 400 hours or less). It would accordingly be desirable and very advantageous from a commercial standdpoint to correct these quality problems and provide reliable high-efficiency incandescent lamps for such lighting applications which would meet or exceed their performance ratings.

SUMMARY OF THE INVENTION

It has been discovered that all of the foregoing problems can be solved by dosing such special service type lamps with a precisely controlled amount of mercuric bromide (HgBr$_2$) which dissociates within the finished lamp, when the filament is energized, and releases a small but critical amount of bromine (Br$_2$) which not only establishes and sustains the desired tungsten-bromine cycle but permits the lamp to be operated at very high efficiencies without premature blackening of the envelope or premature failure of the filament. In accordance with the invention, the HgBr$_2$ dosage is also correlated with the efficiency and life parameters for which the particular lamp is designed so that the precise critical amount of Br$_2$ required to sustain the tungsten-bromine cycle and prevent early filament failure under that specific set of operating conditions will be provided within the energized lamp.

BRIEF DESCRIPTION OF THE DRAWING

A better understanding of the invention will be obtained from the exemplary embodiment shown in the accompanying drawing, wherein.

DESCRIPTION OF THE PREFERRED EMBODIMENTS

Figure 1:
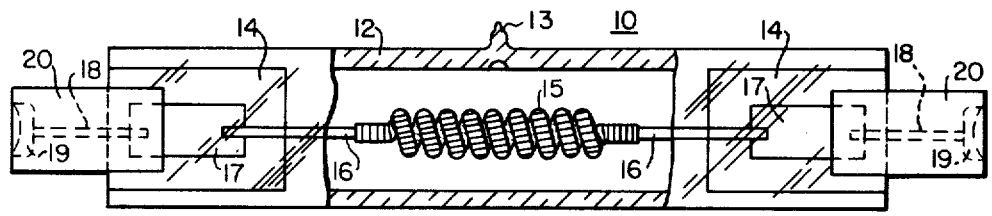
FIG. 1 is an enlarged side elevational view of a double-ended type 1000 watt T-5 bromine-cycle incandescent lamp embodying the invention, a portion of the envelope being removed for illustrative purposes.

A representative regenerative-cycle incandescent lamp 10 which embodies the present invention is shown in FIG. 1. As illustrated, the lamp is of the double-ended variety and has an elongated tubular envelope 12 of suitable radiation-transmitting material that has a high-melting point and can withstand the elevated operating temperatures and gas pressures involved, as well as the effects of the bromine-containing atmosphere and bromide additive, without deteriorating or becoming deformed or bursting. Examples of suitable materials are quartz, borosilicate glass, and other hard glasses that principally comprise fused silica.

The envelope 12 is hermetically sealed by a protruding tipped-off segment 13 of an exhaust tubulation and by press seals 14 that are formed at each of its ends. A tungsten wire filament 15 of the coiled-coil type is longitudinally suspended and centrally located within the envelope 12 and is held in such position by suitable conductor means, such as a pair of tungsten (or molybdenum) inner lead wires 16 that are secured to the singly-coiled legs of the filament and have their opposite ends embedded in the respective press seals 14. The embedded ends of the inner lead wires 16 are electrically connected to strips 17 of molybdenum foil that are hermetically sealed within the respective seals 14. A pair of outer lead wires 18 are joined to the outermost ends of the foil strips 17, thus providing a lead-in conductor assembly at each end of the lamp 10. As will be noted, the outer lead wires 18 are fastened to metal contact buttons 19 (which serve as the lamp terminals) and the protruding ends of the resulting lead-in conductor and terminal assemblies are protectively enclosed and recessed within ceramic sleeves 20 that are fastened to the press seals 14 with suitable cement in accordance with standard lamp-making practice.

The coiled-coil filament 15 is wound from wire that is composed essentially of tungsten but which may contain small amounts of thorium and other dopants to improve its strength, grain structure, etc. Other types of filament configurations can also be used.

The electrical characteristics of the coiled-coil filament 15 and its size relative to that of the tubular envelope 12 are such that the inner surface of the envelope reaches a temperature of at least 250° C, and preferably 500° to 700° C, when the lamp 10 is operated at its rated voltage and wattage. Such lamps are thus quite compact and can be made in a variety of wattage and voltage ratings, overall lengths, and with different design lives and initial efficiencies — depending upon the requirements of the particular lighting application. For example, a 1000 watt T-5 brominecycle lamp of the double-ended type shown in FIG. 1 designed to operate at 120 volts with a nominal initial efficiency of 28 lumens per watt (LPW) for a nominal design life of 150 hours has a mean overall length of about 9.5 cms., a filament with a coiled-coil body portion approximately 2.2 cms. long and 5 mm. in diameter, and a quartz envelope with an outer diameter of approximately 16 mm. and an internal volume of 4.6 cubic centimeters (ml.). Such lamps can be burned in any position and their filaments operate at a color temperature of approximately 3200° K. They are thus especially adapted for use in lighting TV studios and theaters. The ANSI code designation for a lamp of this type have a clear bulb is "DXW". The same lamp with a frosted envelope has a "FBY" code identification.

A double-ended lamp of the same wattage, voltage rating and nominal design life and initial efficiency having a clear envelope of the same outer diameter but which is slightly longer (to provide a mean overall lamp length of about 11.1 cms.) is identified in the trade by the ANSI code designation "DYA". The same lamp with a frosted bulb is known as a "DYN" type lamp.

In accordance with the present invention, the envelope 12 is dosed with a small but carefully controlled-amount of mercuric bromide (HgBr$_2$) and is subsequently filled with a suitable inert gas such as nitrogen, argon, krypton, xenon, or a mixture of two or more of such gases. The amount of HgBr$_2$ placed into the envelope 12 during manufacture is such that a sufficient quantity of Br$_2$ is released and present within the finished lamp 10 to initiate and sustain the well-known tungsten-bromine cycle when the lamp is energized and the HgBr$_2$ is decomposed or dissociated by the heat and the various radiations generated by the incandescent filament 15. The required amount of "free" bromine is produced within the lamp 10 by the following reaction which takes place when the lamp is energized and the filament becomes incandescent:

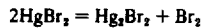

$$2HgBr_2 = Hg_2Br_2 + Br_2$$

It has been discovered that the useful life of bromine-cycle incandescent lamps that are designed to operate at efficiencies above 25 LPW or so and are dosed with HgBr$_2$ can be markedly improved by maintaining the amount of "free" or elemental bromine which is present in the operating lamp within a narrow critical range. This is graphically depicted by curve 22 of FIG. 2 which shows the relationship of life versus Br$_2$ content for the aforementioned 1000 watt T-5 lamp having a nominal design life of 150 hours and a nominal initial efficiency of 28 LPW at 120 volts (DXW and DYA type TV studio and theater lighting lamps.) As will be noted, curve 22 shows that such lamps attain their design life of 150 hours when the HgBr$_2$ dosing is such that it provides about 6 torr of Br$_2$ within the lamp (partial pressure at 27° C or room temperature). As the amount of HgBr$_2$ dosed into the lamp decreases and the amount of Br$_2$ within the operating lamp is decreased, the life surprisingly increases sharply and reaches a maximum of about 450 hours when the Br$_2$ content is approximately 3.5 torr. Further reductions in the HgBr$_2$ dosage and quantity of free bromine released within the lamp causes the life to fall off sharply and premature blackening of the envelope occurs when the operating lamp contains about 2.5 torr of Br$_2$ (as indicated by the hatched region of FIG. 2).

The proper HgBr$_2$ dosage for lamps having the aforementioned combination of design of performance parameters is, accordingly, one which provides from about 2.5 torr to 6 torr of Br$_2$ (at room temperature or 27° C) within the energized lamp. The aforesaid range of Br$_2$ content corresponds to a dosage range of from about 0.13 to 0.32 micromole of HgBr$_2$ per ml. of bulb volume. Since HgBr$_2$ is the only halide dosed into the lamp, the molar ratio of Br$_2$ to Hg is 1:1. As indicated by curve 22, optimum results are obtained when the HgBr$_2$ dosage is such that it provides from about 2.5 to 4.5 torr Br$_2$ within the operating lamp (a dosing range of from about 0.13 to 0.24 micromole of HgBr$_2$ per ml. of bulb volume).

Figure 2:
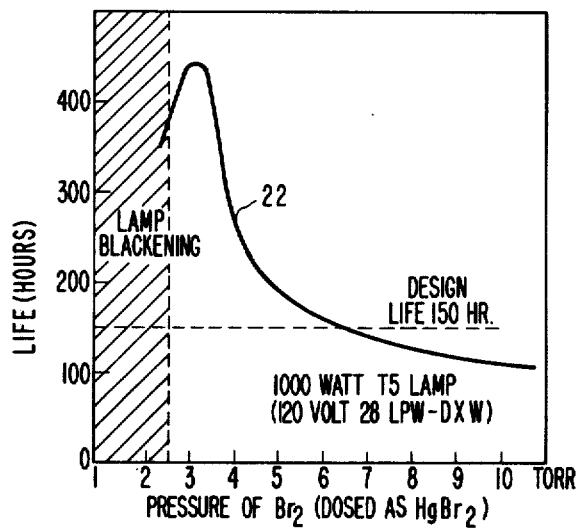
FIG. 2 is a graph showing the critical relationship between the lamp life and the amount of Br$_2$ provided within the finished lamp by the dosed HgBr$_2$ pursuant to the invention.

As shown by curve 22 of FIG. 2, when 1000 watt lamps having the aforesaid design-life and efficiency ratings contain less than about 2.5 torr of Br$_2$ (or less than 0.13 micromole of dosed HgBr$_2$ per ml. of bulb volume) premature blackening of the lamp envelope occurs. When more than about 6 torr of Br$_2$ (or more than about 0.32 micromole of dosed HgBr$_2$ per ml. of bulb volume) is present within the lamp, the lamp fails before its design life of 150 hours (indicated by the dashed line) is reached and its life decreases to around 100 hours when about 10 torr of Br$_2$ is present within the energized lamp. The specified ranges for the Br$_2$ content and HgBr$_2$ dosage are thus critical.

The test data and critical Br$_2$ and dosage ranges discussed above are based on 1000 watt 120 volt DXW and DYA type lamps that contained approximately 1100 torr of nitrogen as the inert fill gas. However, the invention is not limited to this particular fill pressure or type of fill gas and it is contemplated that even further improvements in the useful life and quality of such lamps can be obtained by optimizing both the type and pressure of the inert gas. However, a fill gas pressure above 500 torr and preferably 900 torr or higher should be used.

Experience has shown that the critical HgBr$_2$ dosing and Br$_2$ ranges are not the same for each lamp type but must be properly adjusted and correlated with the design life and initial efficiency parameters of the particular lamp that is involved. This is graphically illustrated by curve 24 of FIG. 3 which shows the relationship between the life of a 1000 watt T-5 lamp of the DXN type (50 hour nominal design life and 33 initial LPW) and the Br$_2$ content provided by the controlled amount of HgBr$_2$ dosed into the envelope pursuant to the invention. As indicated by curve 24, premature blackening of the envelope and early lamp failure (at about 20 hours burning) occur when the energized lamp contains about 3.3 torr of $Br_2$ or less, whereas the life sharply increases to a value much higher than the design life of 50 hours when the $Br_2$ content is increased to 4 torr and then levels of at about 70 hours when the partial pressure of the $Br_2$ is in the range of 5 to 7 torr. The life begins to fall off at higher concentrations of $Br_2$, reaches the 50 hour design life value at about 8.5 torr and then decreases to around 20 hours when the $Br_2$ content is increased to 10 torr.

Thus, even though the DXN type lamp has the same wattage rating, physical dimensions, and bulb volume as the DXW type lamp discussed above, the 100 hour decrease in the nominal design life and the 5 LPW increase in the initial efficiency reflected in the ratings of the DXN type lamp necessitated an upward adjustment of the critical $HgBr_2$ dosing range and in the corresponding amount of $Br_2$ provided within the finished lamp during operation. In the case of 1000 watt, 120 volt T-5 bromine-cycle lamps of the DXN type (which have a nominal design life of 50 hours and a nominal initial efficiency of 33 LPW) the $Br_2$ content range is, accordingly, from about 3.5 to 8.5 torr — which corresponds to a dosing range of from about 0.19 to 0.46 micromole of $HgBr_2$ per ml. of bulb volume. Optimum results are obtained when the $Br_2$ content is in the range of from about 4 to 8 torr (equivalent to a dosing range of from about 0.22 to 0.43 micromole $HgBr_2$ per ml. of bulb volume).

Figure 4:
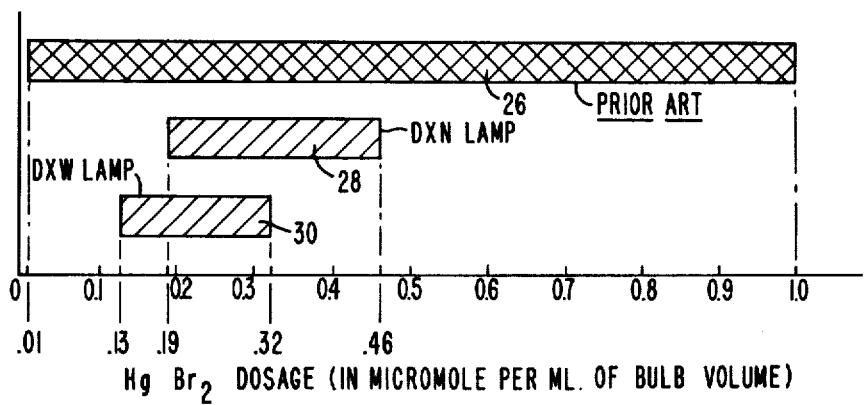
FIG. 4 is a graph comparing the concentration of Br$_2$ employed in prior art lamps dosed with HgBr$_2$ and the amounts of Br$_2$ employed in accordance with the invention using the same additive.

The critical $HgBr_2$ dosing ranges, and equivalent $Br_2$ concentrations, utilized in accordance with the invention are much narrower than and constitute but a small part of the broad $HgBr_2$ dosing range (and $Br_2$ range) employed in the prior art. This is illustrated graphically in FIG. 4. As shown by the cross-hatched bar 26, the $HgBr_2$ dosage used in the prior art halogen-cycle lamps covered a range of from 0.01 to 1.0 micromole of $HgBr_2$ per ml. of bulb volume (pursuant to the teachings of the aforementioned Pavlata patent 131,576). In contrast, the critical dosing range employed in 1000 watt 50 hour T-5 lamps (DXN type) extends from about 0.19 to 0.46 micromole of $HgBr_2$ per ml. of bulb volume (depicted by hatched bar 28). This constitutes only about one-fourth of the broad prior art range.

The difference is even more striking in the case of the 1000 watt 150 hour DXW type lamps. Since only from about 0.13 to 0.32 micromole of $HgBr_2$ per ml. of bulb volume (hatched bar 30) is used in such lamps, the dosing range (and thus the equivalent concentration of $Br_2$) comprises less than about one-fifth of the prior art range.

Figure 3:
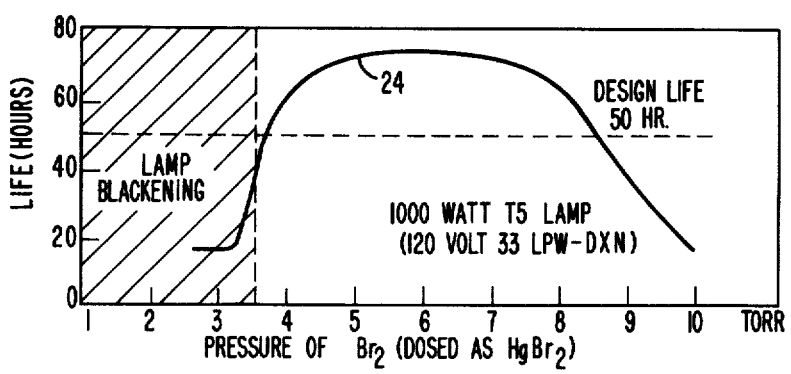
FIG. 3 is a similar graph for a lamp of the same wattage rating and physical size but which has a shorter design life and higher initial efficiency rating.

The partial pressures (in torr units) for the $Br_2$ content of the finished lamps given above and shown in FIGS. 2 and 3 are based on room temperature (27° C or 300° K) and the amount of $Br_2$ is equivalent to that which would be present within the lamps if all of the bromine in the dosed $HgBr_2$ were converted to $Br_2$ gas or vapor at this temperature.

Since $HgBr_2$ is non-volatile at room temperature, it can be readily introduced into the lamp by various means. For example, a carefully weighed quantity of $HgBr_2$ can simply be dropped into the lamp envelope through the exhaust tubulation before the latter is tipped off and sealed. The required amount of $HgBr_2$ can also be pressed into pellets to facilitate dosing in this manner. The $HgBr_2$ can also be dissolved in a suitable volatile solvent, such as benzene, and a measured volume of the resulting solution dispensed into the envelope through the exhaust tube to provide a "liquid-dosing" method.

The invention is not limited to double-ended halogen-cycle lamps of the type illustrated which contain coiled-coil filaments but can be employed with the same advantages in various kinds of high-efficiency lamps (25 LPW and above) that have short design lives (less than 400 hours) — for example, in bromine-cycle incandescent lamps of single-ended construction and lamps that contain singly-coiled, multi-sectional and other types of filaments.

What is claimed is:
1. A regenerative-cycle incandescent lamp which is adapted to be operated at a selected voltage and has predetermined design life and efficiency ratings when operated at said voltage, said lamp comprising;
 a sealed envelope of radiation-transmitting material that contains a filament which is composed essentially of tungsten,
 conductor means extending through said envelope and connected to said filament,
 an inert fill gas within said envelope, and
 means in said envelope for establishing and sustaining a bromine-tungsten cycle within the lamp during the operation thereof which inhibits discoloration of the envelope and enhances the useful life of the lamp, said means comprises a quantity of $HgBr_2$ in the range of from about 0.13 to about 0.46 micromole per milliliter of envelope volume which serves as a source of $Br_2$ within the lamp when the filament is energized and the $HgBr_2$ is subjected to the heat and radiant energy generated by the incandescent filament, the amount of $HgBr_2$ initially present within said envelope and the quantity of $Br_2$ provided thereby during lamp operation being correlated with the design life and efficiency ratings of said lamp in a manner such that the initial $HgBr_2$ content and resultant $Br_2$ content both increase as the efficiency rating increases and the design life rating decreases.

2. The regenerative-cycle incandescent lamp of claim 1 wherein;
 said envelope is of elongated configuration,
 at least a portion of said filament comprises a helical coil that extends longitudinally within the envelope, and
 the efficiency rating of said lamp is at least 25 lumens per watt and said lamp has a nominal design life rating less than 400 hours.

3. The regenerative-cycle incandescent lamp of claim 2 wherein;
 said filament is connected to conductor means that are hermetically sealed in and extend through end portions of the envelope and said lamp is thus of double-ended construction, and
 said inert fill gas is a gas of the group consisting of nitrogen, argon, krypton, xenon, and mixtures thereof at a pressure above 500 torr.

4. The double-ended regenerative-cycle incandescent lamp of claim 3 wherein;
 said fill gas is nitrogen at a pressure of at least 900 torr, and
 said filament is of the coiled-coil type, is composed of tungsten wire and is substantially centrally located within the envelope.

5. The regenerative-cycle incandescent lamp of claim 1 wherein;

said lamp has a nominal design life rating of 150 hours and a nominal initial efficiency rating of 28 lumens per watt, and from about 0.13 to about 0.32 micromole of $HgBr_2$ per milliliter of envelope volume is initially present within said lamp.

6. The regenerative-cycle incandescent lamp of claim 5 wherein the pressure of said inert fill gas is approximately 1100 torr.

7. The regenerative-cycle incandescent lamp of claim 5 wherein the initial $HgBr_2$ content of said lamp is in the range of from about 0.13 to 0.24 micromole per milliliter of envelope volume.

8. The regenerative-cycle incandescent lamp of claim 1 wherein;

said lamp has a nominal design life rating of 50 hours and a nominal initial efficiency rating of 33 lumens per watt, and from about 0.19 to about 0.46 micromole of $HgBr_2$ per milliliter of envelope volume is initially present within said lamp.

9. The regenerative-cycle incandescent lamp of claim 8 wherein the pressure of said inert fill gas is approximately 1100 torr.

10. The regenerative-cycle incandescent lamp of claim 8 wherein the initial $HgBr_2$ content of said lamp is in the range of from about 0.22 to 0.43 micromole per milliliter of envelope volume.

* * * * *